US010435002B2

(12) United States Patent
Domkowski et al.

(10) Patent No.: US 10,435,002 B2
(45) Date of Patent: Oct. 8, 2019

(54) VACUUM SYSTEM FOR A BRAKE BOOSTER

(71) Applicant: GM GLOBAL TECHNOLOGY OPERATIONS LLC, Detroit, MI (US)

(72) Inventors: David Domkowski, Mainz (DE); Alexander Blobner, Oestrich-Winkel (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 28 days.

(21) Appl. No.: 15/834,794

(22) Filed: Dec. 7, 2017

(65) Prior Publication Data
US 2018/0154878 A1    Jun. 7, 2018

(30) Foreign Application Priority Data
Dec. 7, 2016  (DE) .................. 20 2016 007 448 U

(51) Int. Cl.
*B60T 13/52* (2006.01)
*F16K 17/18* (2006.01)
*B60T 13/46* (2006.01)
*B60T 17/02* (2006.01)

(52) U.S. Cl.
CPC ............. *B60T 13/52* (2013.01); *B60T 13/46* (2013.01); *B60T 17/02* (2013.01); *F16K 17/18* (2013.01)

(58) Field of Classification Search
CPC .......... B60T 13/52; B60T 13/46; B60T 17/02; B60T 13/72; F16K 17/18
See application file for complete search history.

(56) References Cited

U.S. PATENT DOCUMENTS 6,042,199 A * 3/2000 Tobisawa .............. B60T 8/4018
303/114.3
8,973,604 B2 * 3/2015 Schneider ............... B60T 13/52
137/512.3

* cited by examiner

*Primary Examiner* — Abiy Teka
(74) *Attorney, Agent, or Firm* — Lorenz & Kopf, LLP

(57) ABSTRACT

A vacuum system for the brake booster of a motor vehicle includes a demand-driven vacuum pump and a vacuum line connected on one end to the vacuum chamber of the brake booster and connected on another end to an intake port of the demand-driven vacuum pump. The vacuum system may include a discharge device arranged on an exhaust air opening of the vacuum system for ensuring bidirectional air volume flow between the external surroundings of the discharge device and the exhaust air opening of the vacuum system, which preventing liquids from reaching the exhaust air opening of the vacuum system as an air volume flows from the exterior surroundings into the exhaust air opening of the vacuum system. The vacuum system may also include a check valve arranged between the intake port of the demand-driven vacuum pump and the connection to a vacuum chamber of the brake booster.

7 Claims, 2 Drawing Sheets

VACUUM SYSTEM FOR A BRAKE BOOSTER

CROSS-REFERENCE TO RELATED APPLICATION

This application claims priority to German Patent Application No. 202016007448.3, filed Dec. 7, 2016, which is incorporated herein by reference in its entirety.

TECHNICAL FIELD

This application pertains to a vacuum system for a brake booster of a motor vehicle.

BACKGROUND

Vacuum brake boosters are well established in automotive engineering and widely used, in particular, in a passenger cars and light-duty commercial vehicles. When the brake pedal is actuated, such brake boosters generate an auxiliary force that boosts an actuating force exerted upon the brake cylinder by the brake pedal. This auxiliary force is generated by a pressure differential between two chambers in the brake booster, which are separated from one another by a movable diaphragm. During such a pedal actuation, atmospheric pressure, i.e. an ambient pressure of the surrounding air, is adjusted in the first chamber by a valve control. A vacuum is generated in the second chamber or so-called vacuum chamber.

The intake section of an internal combustion engine, in which a vacuum is generated, for example by an air volume flow while a throttle valve is closed, conventionally serves as a vacuum source for the vacuum in the vacuum chamber. To this end, the intake section and the vacuum chamber are connected to one another by a vacuum line and corresponding check valves.

In modern engines such as diesel engines or hybrid drive systems, the air volume flow in the intake section of the internal combustion engine may be either insufficient or not permanently available as a vacuum source depending on the operating state of the drive system. As a result, it has become common practice to provide an alternative or supplementary vacuum source for brake boosters in an increasing number of vehicles.

An alternative or supplementary vacuum source may be realized in the form of a vacuum system with a demand-driven vacuum pump having an electric vacuum pump. In addition to the demand-driven vacuum pump, such a vacuum system includes at least one vacuum line, one check valve and, if applicable, an exhaust air line. The exhaust air line may be realized in the form of an exhaust air hose that is installed in the engine compartment of a motor vehicle. The exhaust air line is connected to an exhaust port of the demand-driven vacuum pump with its first end. Its second end is routed to a desired location in the engine compartment.

The vacuum line and the check valve enable the demand-driven vacuum pump to convey an air volume from the vacuum chamber into the engine compartment and therefore into the external surroundings of the vacuum system through the second end of the exhaust air line such that a vacuum relative to the external surroundings, i.e. the atmosphere, is generated in the vacuum chamber.

The demand-driven vacuum pump or an electric vacuum pump can be activated and/or deactivated as needed by a pressure sensor or a pressure switch that monitors the vacuum in the vacuum chamber. When the demand-driven vacuum pump is deactivated, the vacuum in the vacuum chamber is initially maintained by the check valve until the vacuum is consumed, for example, as a result of corresponding brake boosting processes.

At the deactivation moment of the demand-driven vacuum pump, the vacuum prevailing at the check valve is essentially identical to the vacuum in the vacuum chamber. The ambient or atmospheric pressure simultaneously prevails at the second end of the exhaust air line. After the air volume flow conveyed by the demand-driven vacuum pump has been interrupted, the pressure gradient between the check valve and the second end of the exhaust air line causes the vacuum system to be ventilated with ambient air from the second end of the exhaust air line up to the check valve via the demand-driven vacuum pump. In other words, the air required for ventilating the vacuum system is taken in from the engine compartment of the respective motor vehicle through the second end of the exhaust air line.

Investigations have shown that splash water, which enters the engine compartment of a motor vehicle while it is driven in heavy rain, through water or under similar operating conditions, can be taken in by the vacuum system during such a ventilation process. These investigations have furthermore shown that splash water taken in through the second end of the exhaust air line can damage the demand-driven vacuum pump. The same problem also arises if the vacuum system does not include an exhaust air line such that splash water would in this configuration be directly taken in by the exhaust port of the demand-driven vacuum pump.

SUMMARY

The present disclosure provides a vacuum system for a brake booster of a motor vehicle with a demand-driven vacuum pump, in which the intake of splash water can be suppressed.

According to an embodiment of the present disclosure, a vacuum system for the brake booster of a motor vehicle includes a demand-driven vacuum pump and a vacuum line. The vacuum line is configured to be connected to the vacuum chamber of the brake booster and connected to an intake port of the demand-driven vacuum pump.

According to an embodiment of the present disclosure, the vacuum system may include a discharge device that is arranged on an exhaust air opening of the vacuum system. The discharge device is configured to ensure a bidirectional air volume flow between the external surroundings of the discharge device and the exhaust air opening of the vacuum system. The discharge device is configured to prevent liquids from reaching the exhaust air opening of the vacuum system while an air volume flows from the exterior surroundings into the exhaust air opening of the vacuum system. In this regard, the discharge device therefore makes it possible to ventilate, in particular, the vacuum pump with air from the exterior surroundings after a deactivation.

According to another aspect of the present disclosure, a check valve may be arranged between the intake port of the demand-driven vacuum pump and the connection to a vacuum chamber of the brake booster. To this end, the vacuum line may be divided into two vacuum line sections. The check valve is integrated into the vacuum system between the vacuum line sections in this case. The check valve may alternatively also be arranged on the intake port of the demand-driven vacuum pump such that the vacuum line is indirectly connected to the intake port of the demand-driven vacuum pump via the check valve. The check valve is configured to allow an air volume flow from the connection to a vacuum chamber of the brake booster in the direction of the demand-driven vacuum pump and for blocking an oppositely directed air volume flow. The admission of an air volume flow with the ambient pressure into a vacuum chamber of the brake booster, which is connected to the vacuum line, is thereby prevented.

According to another aspect of the present disclosure, the discharge device may include a housing that encloses a chamber. The chamber of the discharge device forms an air volume reservoir and therefore makes available an air volume that suffices for ventilating the vacuum system between the exhaust air opening of the vacuum system and the check valve as soon as the demand-driven vacuum pump is deactivated. The chamber provides the sufficient air volume for partially ventilating the vacuum system irrespective of a potential intake of splash water at the exhaust air opening of the vacuum system.

According to another aspect of the present disclosure, a first volume corresponding to the chamber of the discharge device is larger than or equal to a second volume corresponding to a working volume of a section of the vacuum system, which extends between the check valve and the exhaust air opening of the vacuum system. The term working volume refers to a fluidically active internal volume of the vacuum system that, for example but not conclusively, is defined by the inside diameter and line lengths of the vacuum line and, according to an enhancement of the present disclosure, an exhaust air line, as well as the internal volume of a conveying device of the demand-driven vacuum pump.

If the first volume is chosen greater than or equal to the second volume, sufficient air for ventilating the vacuum system between the exhaust air opening of the vacuum system and the check valve is also available if the region of the second end of the exhaust air line is completely immersed in water during the entire ventilation time.

According to another aspect of the present disclosure, the vacuum system may include an exhaust air line that is configured to be installed in the motor vehicle. A first end of the exhaust air line can therefore be connected to an exhaust port of the demand-driven vacuum pump. In this embodiment of the present disclosure, a second end of the exhaust air line forms the exhaust air opening of the vacuum system, which is connected to the discharge device. The discharge device may alternatively also be connected to the exhaust port of the demand-driven vacuum pump such that an additional exhaust air line can be eliminated. In this case, the exhaust port of the demand-driven vacuum pump forms the exhaust air opening of the vacuum system.

According to another aspect of the present disclosure, a connection piece for being connected to the exhaust air line or for being connected to the exhaust port of the demand-driven vacuum pump may be arranged on a first side of the housing. In this way, the discharge device and the exhaust air line can be exchanged separately of one another. In an alternative embodiment of the present disclosure, the discharge device may be integrated into a housing of the demand-driven vacuum pump.

According to another aspect, at least one opening or a number of openings may be arranged on a second side of the housing and fluidically connected to the chamber and the external surroundings of the discharge device. The housing of the discharge device may furthermore include a hollow-cylindrical housing section.

According to another embodiment, the second side of the housing may be defined by a base of the hollow-cylindrical housing section, wherein the openings may in this embodiment be arranged in a cylinder wall of the hollow-cylindrical housing section adjacent to the base. A plurality of openings may be arranged in the cylinder wall such that they are uniformly spaced apart from one another in the circumferential direction of the hollow-cylindrical housing section. In the case of a moderate entry of splash water, this plurality of openings, which are uniformly distributed in the circumferential direction, makes it possible to ensure with sufficient probability that water does not infiltrate all openings simultaneously. Consequently, the vacuum system can still be provided with ventilation air from the external surroundings through openings, which are not affected by a moderate entry of splash water.

According to another embodiment, the second side of the housing may be closed with a cover inserted into the hollow-cylindrical housing section. Such a two-piece design of the housing on the one hand allows a simple manufacture of the cylindrical housing section, for example, by an injection molding process. In addition, a two-piece housing can also be opened, for example, for cleaning purposes.

According to another aspect, a conically tapered housing section may be connected to the hollow-cylindrical housing section on the first side of the housing. The conically tapered housing section preferably reduces the diameter of the hollow-cylindrical housing section to the diameter of the connection piece such that the corresponding housing sections and the connection piece can be realized in one piece. In addition, the conically tapered housing section causes a reduced flow speed of the air volume flow in this housing section. In this way, an entrainment of liquid drops can either be suppressed or at least reduced while an air volume flows into the vacuum system for ventilation purposes.

Other characteristics and details can be gathered from the following description, in which at least one exemplary embodiment is elucidated in greater detail—if applicable with reference to the drawings. Described and/or graphically illustrated characteristics form the object of the present disclosure individually or in any sensible combination, if applicable also independently of the claims, and particularly may also form the object of one or more separate application/s. Identical, similar and/or functionally identical components are identified by the same reference symbols.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
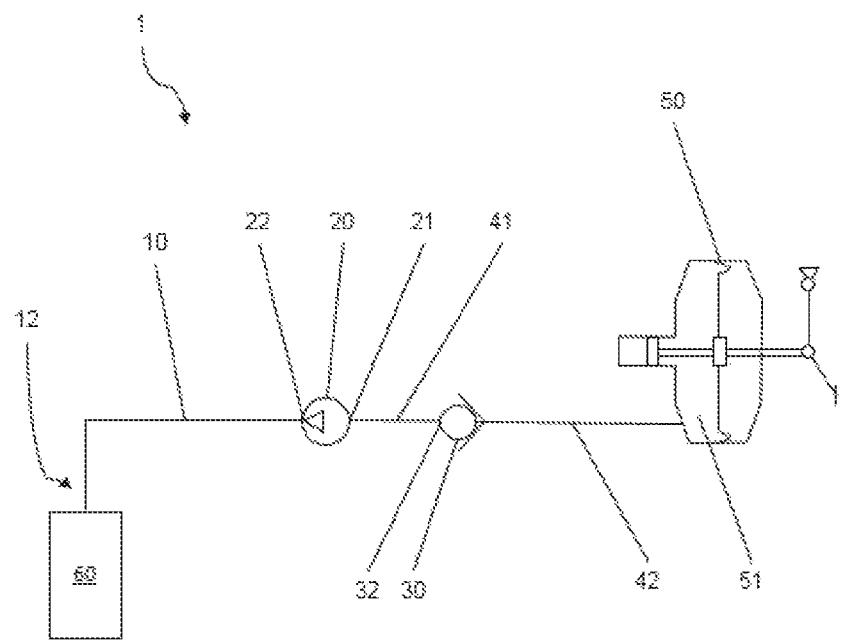
FIG. 1 shows a fluidic diagram of a vacuum system with a brake booster.

FIG. 1 shows a fluidic diagram with a vacuum brake booster, which is simply referred to as brake booster 50 below, and with a vacuum system 1, which is connected to the brake booster 50 in order to generate a vacuum in a vacuum chamber 51 by an electric vacuum pump 30. Instead of using the electric vacuum pump 30, it would also be possible to provide a different type of demand-driven vacuum pump such as a mechanical vacuum pump, which can be coupled to a drive unit by a controllable coupling element.

A vacuum connection or fluidic connection between the vacuum chamber 51 and the electric vacuum pump 20 is produced by a vacuum line. In the present exemplary embodiment, the vacuum line includes two pieces—a first vacuum line section 41 and a second vacuum line section 42, which are connected to one another by a check valve 30. The vacuum line or the two vacuum line sections 41, 42 may be respectively realized, for example, in the form of a vacuum hose.

As an alternative to the embodiment illustrated in FIG. 1, the check valve 30 may also be arranged on the intake port 21 of the electric vacuum pump 20 or on a connector of the vacuum chamber 51 for connecting the vacuum line. The intake port 21 of the electric vacuum pump 20 and the vacuum chamber 51 of the brake booster 50 are connected to one another by a one-piece or multi-piece vacuum line 41, 42 and at least one check valve 30. The check valve 30 is configured to allow an air volume flow in the flow direction from the brake booster 50 to the electric vacuum pump 20 and for blocking an air volume flow in the opposite flow direction.

The electric vacuum pump 20 may include a positive-displacement pump such as a reciprocating pump or a diaphragm pump that is driven by an electric motor. The electric vacuum pump 20 is configured to convey an air volume from the intake port 21 to the exhaust port 22. A vacuum available for boosting a brake force is generated in the vacuum chamber 51 during the at least partial evacuation of the air volume contained in the vacuum chamber 51 of the brake booster 50.

An exhaust air line 10 is connected to the exhaust port 22 with its first end 11 and preferably realized in the form of an exhaust air hose. The exhaust air line 10 may be routed from the exhaust port 22 of the electric vacuum pump 20 to a desired location in the engine compartment such that the air evacuated from the vacuum chamber 51 by the electric vacuum pump 20 can be discharged into the engine compartment at this location through the second end 12 of the exhaust air line 10.

A discharge device 60 is arranged on the second end 12 of the exhaust air line 10 and configured to ensure a bidirectional air volume flow between the external surroundings and the exhaust air line 10. Bidirectional means that an air volume conveyed by the electric vacuum pump 20 can flow from the exhaust air line 10 into the surrounding atmosphere. In addition, an air volume can also flow from the surrounding atmosphere into the exhaust air line 10 after the electric vacuum pump 20 has been deactivated such that the vacuum system 1 is ventilated in a section between the discharge device 60 and the check valve 30. In other words, a vacuum is equalized in front of the intake port 21 of the electric vacuum pump 20.

Figure 2:
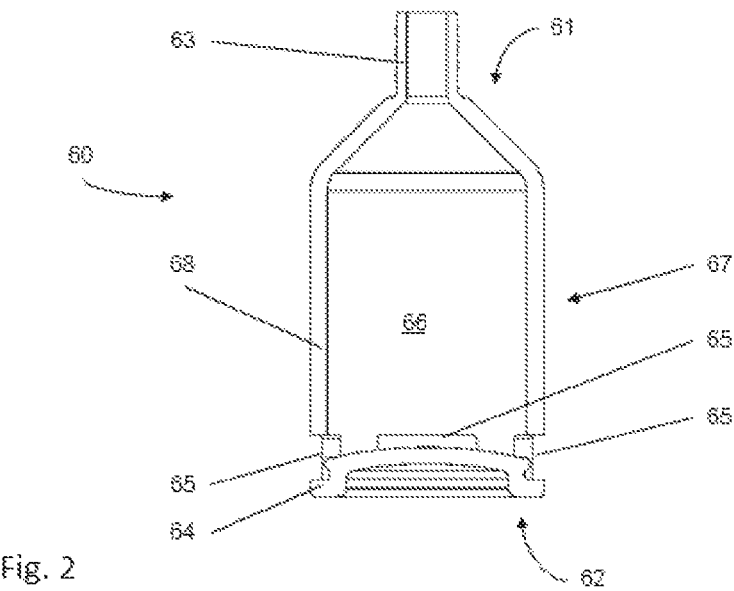
FIG. 2 shows a cross section through a discharge device of the vacuum system.
Figure 3:
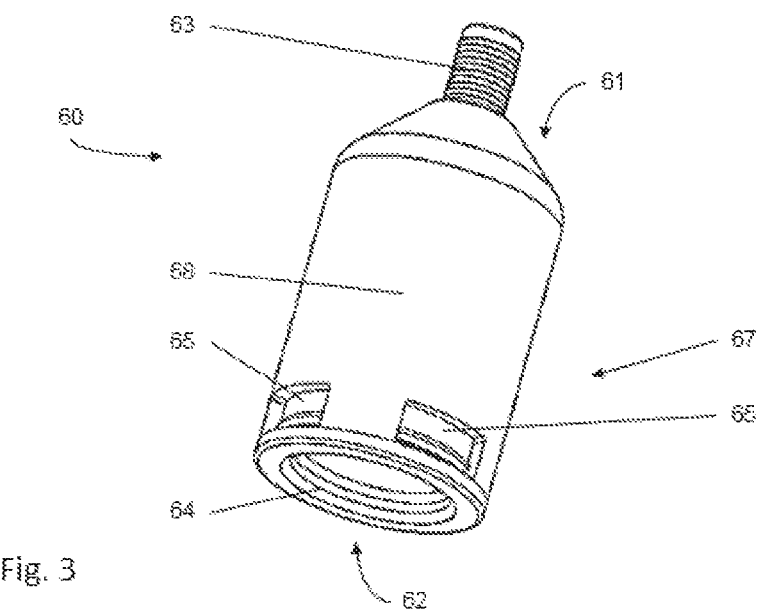
FIG. 3 shows a perspective view of a discharge device of the vacuum system.

An exemplary embodiment of the discharge device 60 is illustrated in greater detail in FIGS. 2 and 3. The discharge device 60 includes a housing 68 with a cylindrical base body. The cross section according to FIG. 2 shows that a chamber 66 is formed in the interior of the housing 68. The housing 68 includes a hollow-cylindrical section with a cylindrical wall 67. A conically tapered section is provided on the first side 61 of the housing 66 and tapered from the diameter of the cylinder wall 67 to the diameter of a connection piece 63.

The connection piece 63 may be realized in the form of a hose connector, to which an exhaust air line 10 in the form of an exhaust air hose can be or is attached. The connection piece 63 ensures a fluidic connection between the exhaust air line 10 illustrated in FIG. 1 and the chamber 66. A different connecting point to the opening on the first side 61 housing 68, which ensures a connection between the chamber 66 and the interior of the exhaust air line 10, would basically also be sufficient.

The second side 62 of the housing 68 is closed with a cover 64 that is inserted into the hollow-cylindrical housing section. According to FIGS. 2 and 3, the cover 64 may be clipped into the hollow-cylindrical section of the housing by a tongue-and-groove joint. Alternatively, a screw-type cover and/or an adhesive cover may also be provided in this case.

FIG. 3, in particular, shows that the second side 62 of the housing 68 is provided with a plurality of openings 65 that are arranged in the cylinder wall 67. The openings 65 are uniformly spaced apart from one another in the circumferential direction of the cylindrical housing section and border on the cover 64. The openings 66 provide a fluidic connection between the chamber 66 and the external surroundings of the separating device, i.e. the surrounding atmosphere of the separating device and of the entire vacuum system.

An air volume is evacuated from the vacuum chamber 51 by the electric vacuum pump 20 as soon as the vacuum system 1 is activated, for example, by a vacuum switch or pressure sensor on the brake booster 50. The resulting air volume flow is conveyed through the exhaust air line 10 and reaches the chamber 66 through the connection piece 63 on the first side 61 of the housing 68. The air volume conveyed into the chamber 66 can escape into the engine compartment of a motor vehicle, i.e. into the atmosphere, through the openings 65 on the second side 62 of the housing 68.

The air volume flow conveyed by the electric vacuum pump 20 ceases as soon as the vacuum system 1 is deactivated by a vacuum switch or pressure sensor on the brake booster 50. At such a deactivation moment, a vacuum prevails at the outlet 32 of the check valve 30, whereas atmospheric pressure prevails at the openings 65 of the discharge device 60. The pressure gradient between the openings 65 of the discharge device 60 and the outlet 32 of the check valve 30 attempts to generate a volume flow that is directed opposite to the pumping direction of the electric vacuum pump 30 until the pressure gradient is compensated and the vacuum system 1 is ventilated in the section between the openings of the discharge device 60 and the check valve 30.

During this ventilation process, air is taken in from the surrounding atmosphere through the openings 65 of the discharge device 60. The discharge device 60 is arranged in the engine compartment of a motor vehicle and therefore exposed to splash water, which can enter the engine compartment, for example, in heavy rain or while driving through water. Under these circumstances, water may also be taken in through the openings 65 of the discharge device 60 during the intake of the air for ventilating the vacuum system 1 and therefore reach the chamber 66 of the discharge device 60.

The volume of the chamber 66 is dimensioned in such a way that it stores a sufficient air volume for ventilating a section of the vacuum system 1, which is respectively formed between the second end of the exhaust air line or the connection piece 63 of the discharge device 60 and the outlet 32 of the check valve. The ventilation process can be completed with the air volume stored in the chamber before the water taken into the chamber reaches the exhaust air line.

The chamber volume of the chamber 66 preferably corresponds to the volume, which is altogether enclosed by the exhaust air line 10, the working volume of the electric vacuum pump 20 and the first section of the vacuum line 41. In this way, complete ventilation can also be ensured if all of the openings 65 of the discharge device 60 are exposed to or submersed in water. No further air volume flow takes place as soon as the pressure gradient in the vacuum system 1 has been compensated after the completion of the ventilation process. Any water taken into the chamber 66 of the discharge device 60 can subsequently drain through at least one of the openings 65 of the discharge device 60 under the force of gravity. Air from the atmosphere for compensating the drained water volume can simultaneously reach the chamber 66 through at least one other opening 65 in the discharge device 60 such that a sufficient air volume for another ventilation process is once again available in the chamber 66. In addition, any potentially remaining water in the chamber 66 can be ejected through the openings 65 in the discharge device 60 when the electric vacuum pump is activated again.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A vacuum system for a brake booster of a motor vehicle comprising:
    a demand-driven vacuum pump having an intake port and an exhaust port;
    a vacuum line having a first vacuum line section in fluid communication with the intake port of the demand-driven vacuum pump and a second vacuum line section configured to connect to a vacuum chamber of the brake booster;
    an exhaust air line having a first end connected to the exhaust port and a second end; and
    a discharge device connected to the second end of the exhaust line and configured to ensure a bidirectional air volume flow between the external surroundings of the discharge device and the second end of the exhaust air line, the discharge device includes a housing having a first side that includes a connection piece to fluidly couple the discharge device to the second end of the exhaust air line and a second side, the housing including a conically tapered housing section connected to the connection piece that transitions to a hollow-cylindrical housing section that extends between the conically tapered housing section and the second side, the discharge device including a cover that closes the second side and a portion of the cover is inserted into the hollow-cylindrical housing section, the second side of the housing including a plurality of openings spaced apart about a circumference of the hollow-cylindrical housing section that border the portion of the cover that is inserted into the hollow-cylindrical housing section, with a chamber defined within an interior of the housing,
    wherein the discharge device is configured to prevent liquids from reaching the second end of the exhaust air line while an air volume flows from the exterior surroundings into the vacuum system.

2. The vacuum system according to claim 1, wherein a check valve is arranged between the intake port of the demand-driven vacuum pump and the connection to the vacuum chamber of the brake booster, and the check valve interconnects the first vacuum line section to the second vacuum line section.

3. The vacuum system according to claim 1, wherein a first volume, which corresponds to the chamber of the discharge device is greater than or equal to a second volume, which corresponds to a working volume of a section between the check valve and the second end of the exhaust air line.

4. The vacuum system according to claim 1, wherein the plurality of openings are fluidically connected to the chamber defined within the interior of the housing and the external surroundings of the discharge device.

5. The vacuum system according to claim 1, wherein the second side of the housing is defined by a base of the hollow-cylindrical housing section, and wherein the openings are arranged in a cylinder wall of the hollow-cylindrical housing section adjacent to the base.

6. The vacuum system according to claim 5, wherein the plurality of openings are arranged in the cylinder wall such that they are uniformly spaced apart from one another in the circumferential direction of the hollow-cylindrical housing section.

7. A motor vehicle with a vacuum system, comprising:
    a brake booster;
    a demand-driven vacuum pump having an intake port and an exhaust port;
    a vacuum line having a first vacuum line section in fluid communication with the intake port of the demand-driven vacuum pump and a second vacuum line section configured to connect to a vacuum chamber of the brake booster;
    a check valve that interconnects the first vacuum line section to the second vacuum line section;
    an exhaust air line having a first end connected to the exhaust port and a second end; and
    a discharge device connected to the second end of the exhaust line and configured to ensure a bidirectional air volume flow between the external surroundings of the discharge device and the second end of the exhaust air line, the discharge device includes a housing having a first side that includes a connection piece to fluidly couple the discharge device to the second end of the exhaust air line and a second side, the housing including a conically tapered housing section connected to the connection piece that transitions to a hollow-cylindrical housing section that extends between the conically tapered housing section and the second side, the discharge device including a cover that closes the second side and a portion of the cover is inserted into the hollow-cylindrical housing section, the second side of the housing including a plurality of openings spaced apart about a circumference of the hollow-cylindrical housing section that border the portion of the cover that is inserted into the hollow-cylindrical housing section, with a chamber defined within an interior of the housing that extends from the first side to the portion of the cover that is inserted within the hollow-cylindrical housing section,
wherein the discharge device is configured to prevent liquids from reaching the second end of the exhaust air line while an air volume flows from the exterior surroundings into the vacuum system.

\* \* \* \* \*